(12) United States Patent
Zou et al.

(10) Patent No.: US 11,739,908 B2
(45) Date of Patent: Aug. 29, 2023

(54) PANEL LIGHT WITH NIGHT LIGHT FUNCTION

(71) Applicant: Shenzhen Ephan Technology Co.,Ltd, Shenzhen (CN)

(72) Inventors: Shuiqi Zou, Shenzhen (CN); Hao Tian, Shenzhen (CN)

(73) Assignee: SHENZHEN EPHAN TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/105,259

(22) Filed: Feb. 3, 2023

(65) Prior Publication Data

US 2023/0184404 A1 Jun. 15, 2023

(30) Foreign Application Priority Data

Nov. 2, 2022 (CN) .......................... 202222920141.8

(51) Int. Cl.
| | |
|---|---|
| *F21V 5/00* | (2018.01) |
| *F21V 7/05* | (2006.01) |
| *F21V 23/04* | (2006.01) |
| *F21V 8/00* | (2006.01) |
| *F21Y 105/18* | (2016.01) |

(52) U.S. Cl.
CPC .................. *F21V 5/00* (2013.01); *F21V 7/05* (2013.01); *F21V 23/0435* (2013.01); *G02B 6/0073* (2013.01); *F21Y 2105/18* (2016.08)

(58) Field of Classification Search
CPC .......... F21V 5/00; F21V 7/05; F21V 23/0435; G02B 6/0073; F21Y 2105/18
See application file for complete search history.

(56) References Cited

U.S. PATENT DOCUMENTS

| | | | |
|---|---|---|---|
| 2004/0156182 A1 | 8/2004 | Hatjasalo | |
| 2015/0070934 A1* | 3/2015 | Chou | ................... G02B 6/0088 362/613 |
| 2015/0205030 A1 | 7/2015 | Chen | |
| 2020/0191344 A1* | 6/2020 | Van Winkle | ........... G02B 6/005 |
| 2020/0303353 A1 | 9/2020 | Deng | |

* cited by examiner

*Primary Examiner* — Mary Ellen Bowman
(74) *Attorney, Agent, or Firm* — Daniel M. Cohn; Howard M. Cohn

(57) ABSTRACT

The present disclosure provides a panel light with a night light function, including a main surface ring, a night light surface ring, a backing plate, a diffusion ring, a scattering micro-lens ring, a main light bar, a night light bar, a diffusion plate, a light guide plate and a reflective sheet; the main surface ring is a hollow annular cavity, the diffusion ring and the scattering micro-lens ring are disposed inside the night light surface ring, the main light bar is fixedly disposed inside the annular cavity of the main surface ring, the night light bar is disposed in a cavity formed by enclosing the main surface ring and the night light surface ring, and the diffusion plate, the light guide plate and the reflective sheet are successively disposed in the annular cavity of the main surface ring from bottom to top.

10 Claims, 6 Drawing Sheets

PANEL LIGHT WITH NIGHT LIGHT FUNCTION

TECHNICAL FIELD

The present disclosure relates to the technical field of lamps, in particular to a panel light with a night light function.

BACKGROUND

As a high-end indoor lighting fixture, a panel light has an aesthetic and minimalist design and a better lighting effect. When the panel light works, light forms an uniform plane light-emitting effect after passing through a light guide plate with a high light transmittance; and therefore the panel light has the effects of good illuminance uniformity, soft and comfortable light and brightness, not resulting in visual fatigue after long term of use. An LED with energy conservation, environment protection and long service life is usually adopted to provide light source, so the LED is widely used in schools, hospitals, libraries, museums, metros, supermarkets, entertainment venues and other commercial lighting, and the LED is also gradually used for home lighting. However, the light source of the panel light on the current market has stronger brightness during use, and the panel light can be turned on or turned off integrally, so as not to meet the demand that a user does not require the hard light before sleeping or in an office, and an applicable scene of the panel light is limited.

The patent application No. CN214425756U provides a panel light with a small night light function. The panel light includes a diffusion plate, a light guide plate, a reflective sheet, a buffer layer, a backing plate and a light frame; the diffusion plate, the light guide plate, the reflective sheeting, the buffer layer and the backing plate are successively disposed at a middle of the panel light from top to bottom, and the light frame surrounds an outer side of the panel light. The light frame includes a light source installation slot and a horizontal limiting plate disposed at one side of the light source installation slot, limiting necks are symmetrically disposed at two sides of a slot wall of the light source installation slot, a fixing slot is formed between a lower side of the horizontal limiting plate and an outer side wall of the light source installation slot, a night light source plate is installed in the light source installation slot, a main light source plate is installed on an outer side wall of the fixing slot, night light transmitting plates are inserted into the limiting necks, a plurality of screws are disposed at an edge of the backing plate, the backing plate is installed in the light frame through an interference fit between the screws and the fixing slot, and an external power supply is disposed at one side of the backing plate. The technical solution may meet a plurality of needs of the user, expand the applicable scene of the panel light, but exists the problem that lamp beads of the night light have granular sensation and color partition. Therefore, a panel light with a night light function is provided, so as to solve the problem that the lamp beads of the existing night light have granular sensation and color partition.

SUMMARY

One of the purposes of the present disclosure is to provide a panel light with a night light function, so as to solve the problem that lamp beads of a small night light have granular sensation and color partition.

The panel light with the night light function provided by the present disclosure is implemented by the following technical solution:

The panel light with the night light function provided by the present disclosure includes a main surface ring, a night light surface ring, a backing plate, a diffusion ring, a scattering micro-lens ring, a main light bar, a night light bar, a diffusion plate, a light guide plate and a reflective sheet. The main surface ring is a hollow annular cavity, the night light surface ring and the backing plate are successively disposed on the main surface ring, the diffusion ring and the scattering micro-lens ring are disposed inside the night light surface ring, the main light bar is fixedly disposed inside the annular cavity of the main surface ring, the night light bar is disposed in a cavity formed by enclosing the main surface ring and the night light surface ring, the diffusion ring and the scattering micro-lens ring diffuse and reflect rays sent by the night light bar respectively, and the diffusion plate, the light guide plate and the reflective sheet are successively disposed in the annular cavity of the main surface ring from bottom to top.

In one implementation mode, the main surface ring includes a surface ring main body and a radiating rib, the surface ring main body is a hollow and annular aluminum alloy die casting, the radiating rib is disposed at a side of a hollow ring of the surface ring main body, and the radiating rib is higher than the night light surface ring.

In one implementation mode, the main light bar and the night light bar are respectively disposed at two sides of the radiating rib.

In one implementation mode, the main surface ring at least includes two installation members, which are disposed on the surface ring main body.

In one implementation mode, the two installation members are symmetrically disposed on the surface ring main body, and a trunking is disposed on one installation member.

In one implementation mode, a plurality of fixing studs are disposed on the night light surface ring.

In one implementation mode, the backing plate fixes the main surface ring and the night light surface ring through a plurality of fixing members.

In one implementation mode, a plurality of LED light beads with different colors and temperatures are successively and respectively disposed on the main light bar and the night light bar at equal intervals.

In one implementation mode, a control plate is disposed in the cavity formed by the main surface ring and the backing plate or on the backing plate, and the control plate is respectively and electrically connected to the main light bar and the night light bar.

In one implementation mode, a wireless remote control module is disposed on the control plate.

Compared with the prior art, the panel light with the night light function provided by the present disclosure has the following beneficial effects:

The panel light with the night light function provided by the present disclosure can achieve the effects of mixing light and eliminating light-emitting granular sensation of the light beads in a manner that the diffusion ring and the scattering micro-lens ring are respectively disposed inside the night light surface ring, and the rays sent by the night light bar are successively diffused through the diffusion ring and reflected in a great angle through the scattering micro-lens ring. Diffusion and light mixing are implemented at the same time in a narrow space through an unique light mixing diffusion structure design of the night light surface ring, and problems of granular sensation and color partition of the light-emitting light beads are observably eliminated.

The panel light with the night light function provided by the present disclosure effectively ensures the radiating effects of the main light bar and the night light bar through an exposed design of the radiating rib.

The panel light with the night light function provided by the present disclosure enables the night light bar to be electrically connected to the control plate by adopting a hidden trunking structure, so as to solve the problem that the common panel light and the night panel light cannot share the surface ring, and therefore the material type, the inventory and the management cost are reduced during a manufacturing process.

BRIEF DESCRIPTION OF THE DRAWINGS

To better clarify the technical solution of the embodiments of present disclosure, the drawings required to illustrate the embodiments of present disclosure will be simply described below. It is understood that the drawings described below merely illustrate some embodiments of present disclosure, so it is not a limitation to the scope. Those ordinarily skilled in the art can obtain other related drawings of other embodiments without creative labor on the basis of those drawings.

Figure 1:
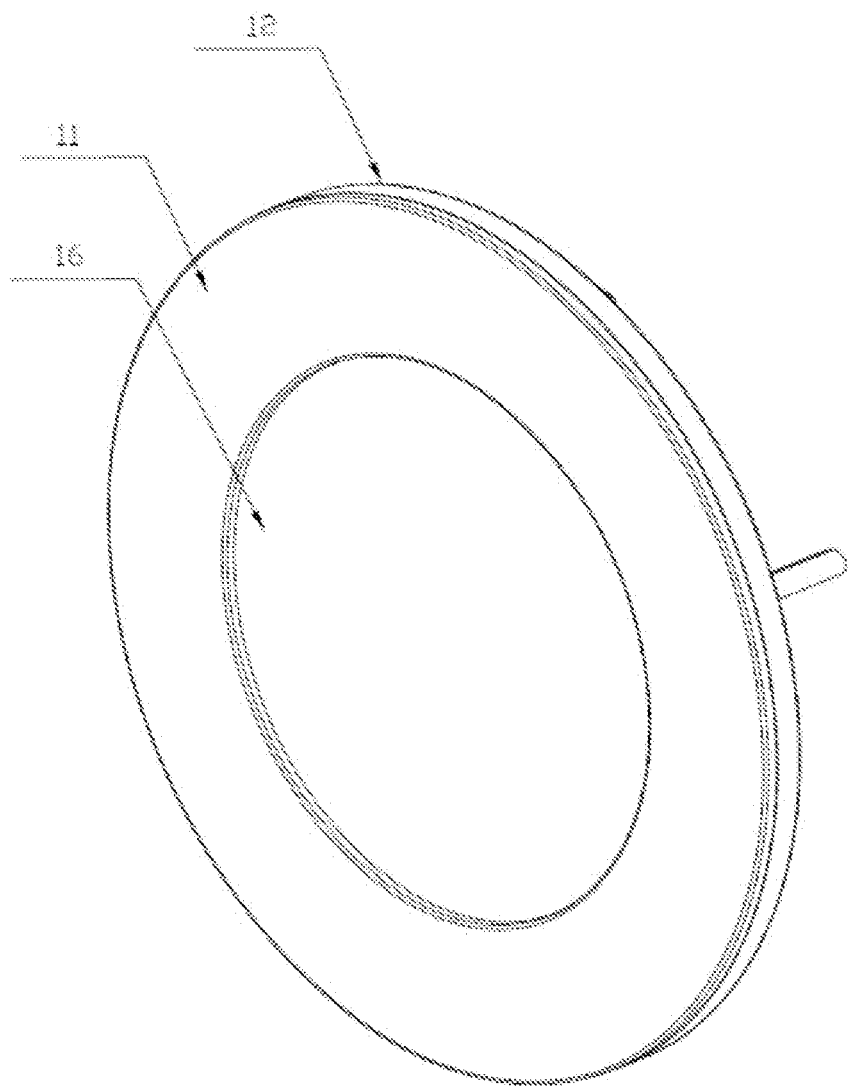
FIG. 1 is a structure schematic diagram of a panel light with a night light function provided by the present disclosure.
Figure 2:
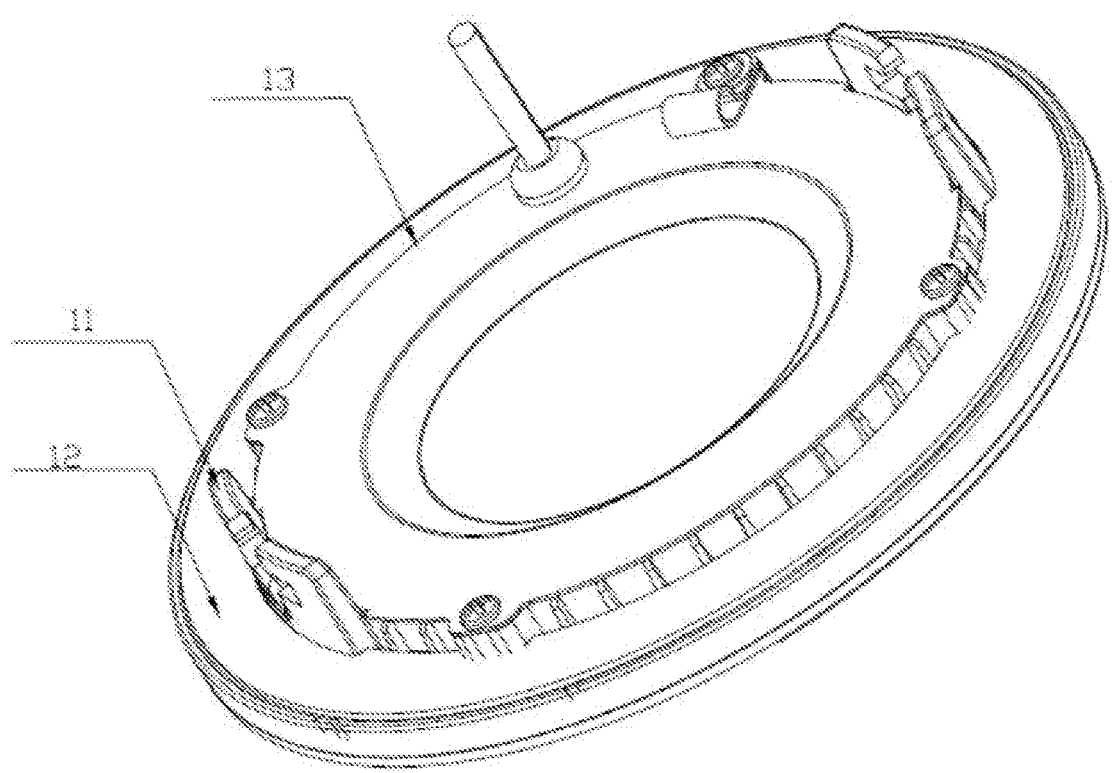
FIG. 2 is a structure schematic diagram of another side of a panel light with a night light function provided by the present disclosure.

Reference signs: 11. Main surface ring, 111. Surface ring main body, 112. Radiating rib, 113. Installation member, 1131. Trunking, 12. Night light surface ring, 121. Diffusion ring, 122. Scattering micro-lens ring, 123. Fixing stud, 13. Backing plate, 14. Main light bar, 15. Night light bar. 16. Diffusion plate, 17. Light guide plate, 18. Reflective sheet, 19. Control plate, 20. Fixing member.

DETAILED DESCRIPTION OF THE EMBODIMENTS

In the description of the present disclosure, it is noted that orientation or position relationships indicated by the terms "upper", "lower" and the like are based on the orientation or position relationships of the usual placement of the products of the present disclosure when being used, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In addition, in the present disclosure, unless specific regulation and limitation otherwise, the first feature"onto" or "under" the second feature may include the direct contact of the first feature and the second feature, or may include the contact of the first feature and the second feature through other features between them instead of direct contact. Moreover, the first feature"onto", "above" and "on" the second feature includes that the first feature is right above and obliquely above the second feature, or merely indicates that the horizontal height of the first feature is higher than the second feature. The first feature"under", "below" and "down" the second feature includes that the first feature is right below and obliquely below the second feature, or merely indicates that the horizontal height of the first feature is less than the second feature.

In addition, the terms "horizontal", "vertical", and the like do not mean that the component is required to be absolutely horizontal or suspended, but can be slightly tilted. The term "horizontal" merely means that the direction is more horizontal than the term "vertical", but does not mean that the structure must be completely horizontal, but can be slightly tilted.

In the description of the present disclosure, it is noted that, unless specific regulation and limitation otherwise, terms "set", "join" and "connect" should be generally understood, for example, may a fixed connection, or a detachable connection, or an integrated connection, may a mechanical connection or an electric connection, may a direct connection or an indirect connection through an intermediation, and may an internal connection of two elements. Those of ordinary skill in the art may understand the specific meaning of the terms in the present disclosure according to specific conditions.

Please refer to FIG. 1 to FIG. 4, a panel light with a night light function provided by the present disclosure includes a main surface ring 11, a night light surface ring 12, a backing plate 13, a main light bar 14, a night light bar 15, a diffusion plate 16, a light guide plate 17 and a reflective sheet 18. The main surface ring 11 is a hollow annular cavity, the night light surface ring 12 is disposed on the main surface ring 11, and the night light surface ring 12 is made of transparent or semi-transparent materials, so that rays sent by the night light bar 15 are convenient to transmit from a side of the night light surface ring 12. The backing plate 13 is disposed on the night light surface ring 12 for fixing the main surface ring 11 and the night light surface ring 12. The main light bar 14 is fixedly disposed inside the annular cavity of the main surface ring 11, the night light bar 15 is disposed in a cavity formed by enclosing the main surface ring 11 and the night light surface ring 12, the diffusion ring 16, the light guide plate 17 and the reflective sheet 18 are successively disposed inside the annular cavity of the main surface ring 11 from bottom to top, so as to diffuse, guide and reflect the rays sent by the main light bar 14 respectively.

Figure 3:
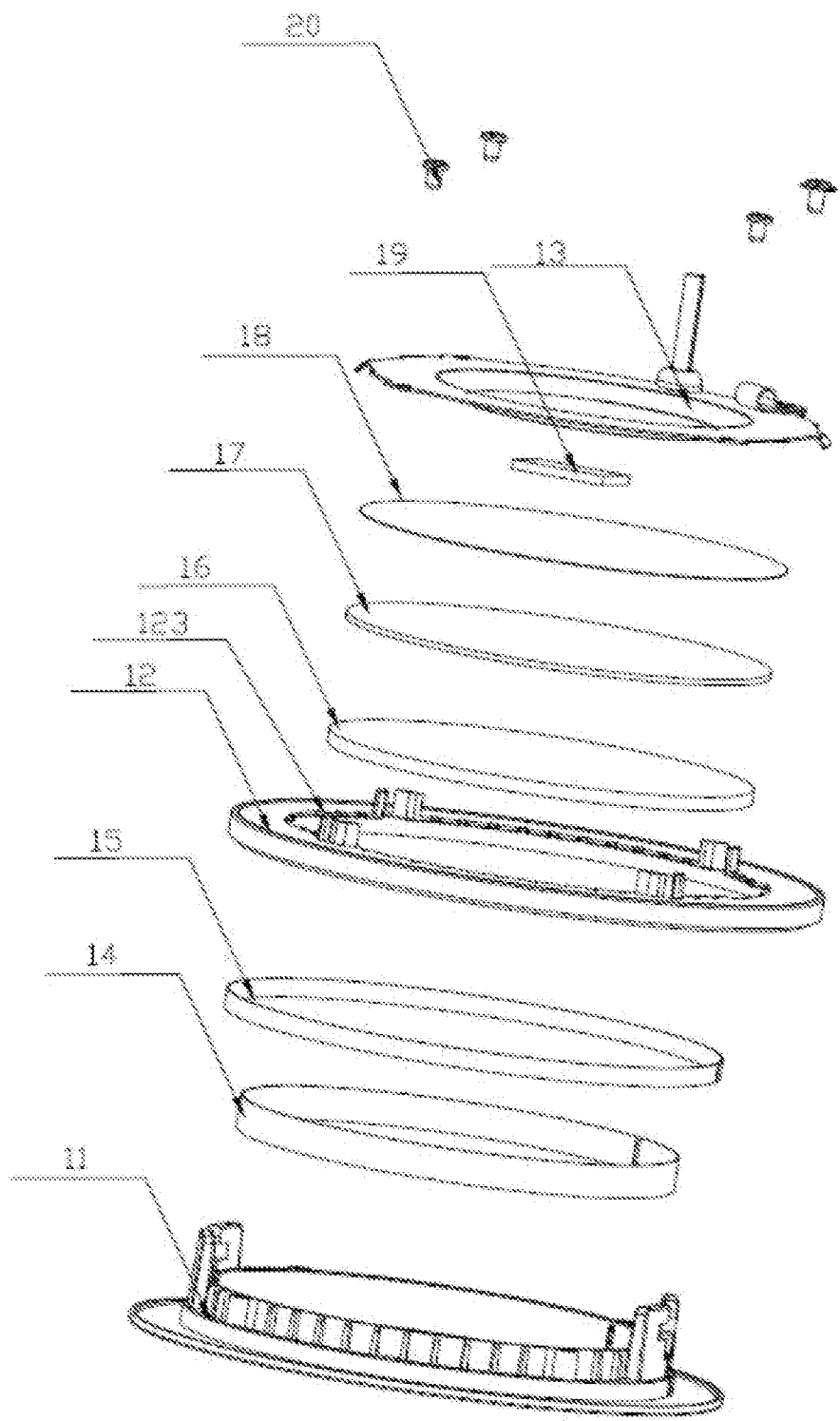
FIG. 3 is an explosion structure schematic diagram, a main surface ring and a night light surface ring of a panel light with a night light function provided by the present disclosure.
Figure 4:
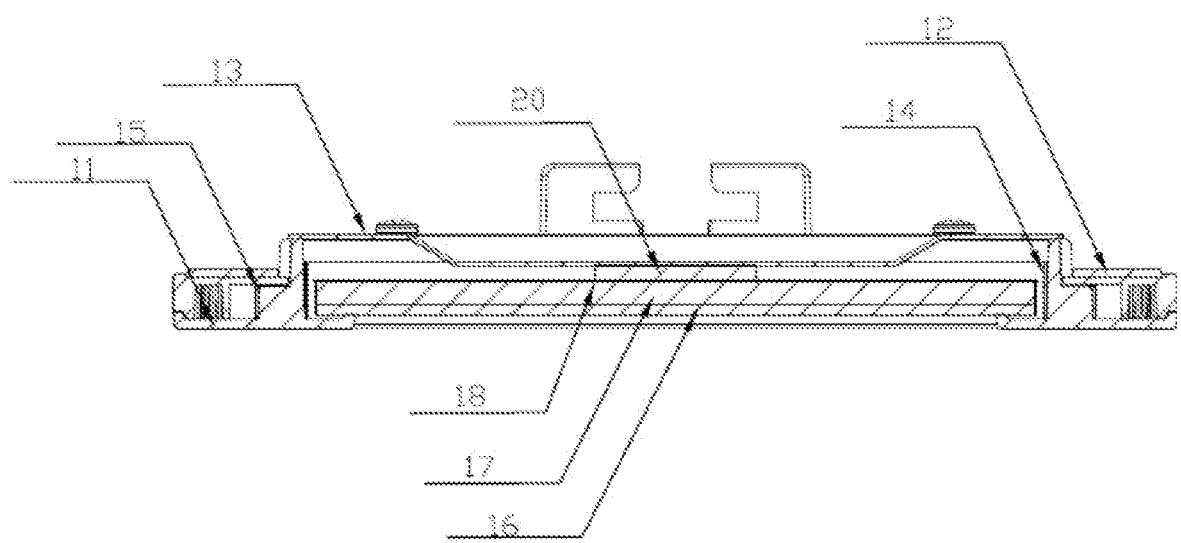
FIG. 4 is a section structure schematic diagram of a panel light with a night light function provided by the present disclosure.
Figure 5:
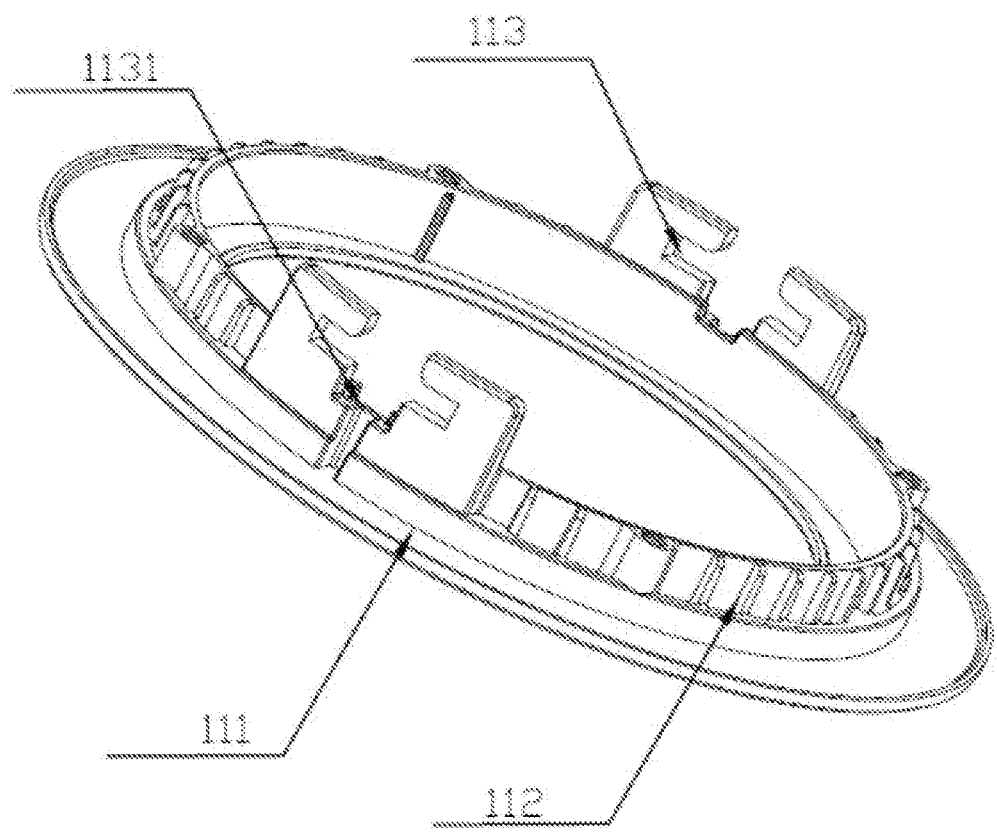
FIG. 5 is a structure schematic diagram of a main surface ring of a panel light with a night light function provided by the present disclosure.

Please refer to FIG. 3 to FIG. 5, the main surface ring 11 includes a surface ring main body 111, a radiating rib 112 and at least one installation member 113. The surface ring main body 111 is a hollow and annular aluminum alloy die casting, and the diffusion ring 16, the light guide plate 17 and the reflective sheet 18 are successively disposed inside a hollow ring of the surface ring main body 11 from bottom to top. The radiating rib 112 is disposed at a side of a hollow ring of the surface ring main body 11, and the radiating rib 112 is higher than the night light surface ring 12, so as to improve the radiating effect of the radiating rib 112 conveniently. The main light bar 14 and the night light bar 15 are respectively disposed at two sides of the radiating rib 112, so that the radiating rib 112 is convenient to conduct heat generated by the main light bar 14 and the night light bar 15. Preferably, the radiating rib 112 is made of aluminum alloy; at least two installation members 113 are disposed on the surface ring main body 111, and the panel light is convenient to fix and install through the at least two installation members 113. In this embodiment, the two installation members 113 are symmetrically disposed on the surface ring main body 111, a trunking 1131 is disposed on one installation member 113, and electric energy is convenient to provide to the night light bar 15 through the trunking 1131.

Figure 6:
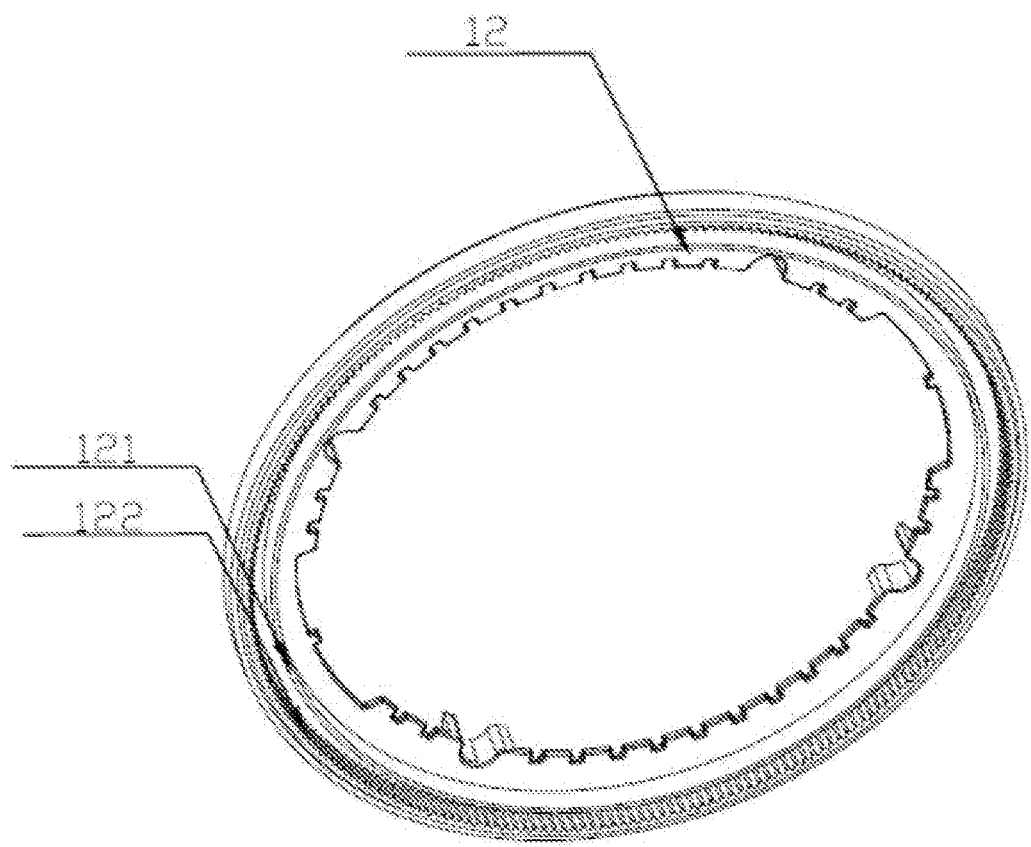
FIG. 6 is a structure schematic diagram of a night light surface ring of a panel light with a night light function provided by the present disclosure.

Please refer to FIG. 3, FIG. 4 and FIG. 6, in this embodiment, a diffusion ring 121 and a scattering micro-lens ring 122 are disposed inside the night light surface ring 12, and a shape of the scattering micro-lens ring 122 is a sawtooth ring. A role of the diffusion ring 121 is equivalent to the diffusion plate 16, rays sent by cold white and warm white light beads in the night light bar 15 are preliminarily diffused, so as to reduce the granular sensation when the light beads in the night light bar 15 emit light. The rays diffused through the diffusion ring 121 are reflected in a great angle through the scattering micro-lens ring 122, so that the cold white and warm white rays may be interwoven together, thereby achieving the effects of mixing light and eliminating light-emitting granular sensation of the light beads. In this embodiment, a plurality of fixing studs 123 are disposed on the night light surface ring 12, and the night light surface ring 12 is convenient to install on the main surface ring 11 through the role of the plurality of fixing studs 123.

Please refer to FIG. 3 and FIG. 4, the backing plate 13 fixes the main surface ring 11 and the night light surface ring 12 through a plurality of fixing members 20, and in this embodiment, the fixing members 20 are screws. In this embodiment, a plurality of LED light beads with different colors and temperatures are successively and respectively disposed on the main light bar 14 and the night light bar 15 at equal intervals, and a lighting function is implemented through the light-emitting of the plurality of LED light beads. In this embodiment, a control plate 19 is disposed in the cavity formed by the main surface ring 11 and the backing plate 13, and the control plate 19 is respectively and electrically connected to the main light bar 14 and the night light bar 15, so as to control the main light bar 14 and the night light bar 15 respectively. The control technology adopted by the control plate 19 is the existing technology, so its specific control technology and model are not repeated herein as long as meeting the demands of the present disclosure. In some embodiments, the control plate 19 may also be disposed on the backing plate 13 and respectively and electrically connected to the main light bar 14 and the night light bar 15. In other embodiments, a wireless remote control module may be disposed on the control plate 19, and the main light bar 14 and the night light bar 15 are subjected to wireless control through the wireless remote control module. Specifically, the wireless remote control module may be an infrared wireless remote control module, a Bluetooth wireless remote control module or a WIFI wireless remote control module.

It is noted that the panel light with the night light function provided by the present disclosure can achieve the effects of mixing light and eliminating light-emitting granular sensation of the light beads in a manner that the night light bar 15 is disposed inside the cavity formed by enclosing the main surface ring 11 and the night light surface ring 12, and the diffusion ring 121 and the scattering micro-lens ring 122 disposed in the night light surface ring 12 diffuse and reflect the rays sent by the night light bar 15; and the radiating effect of the main light bar 14 and the night light bar 15 is effectively ensured by exposing the radiating rib 112.

The above embodiments only express some implementation modes of the present disclosure and are specifically described in detail and not thus understood as limits to the patent scope of the present disclosure. It is to be pointed out that those of ordinary skill in the art may further make a plurality of transformations and improvements without departing from the concept of the present disclosure and all of these fall within the scope of protection of the present disclosure. Therefore, the scope of patent protection of the present disclosure should be subject to the appended claims

What is claimed is:

1. A panel light with a night light function, comprising a main surface ring, a night light surface ring, a backing plate, a diffusion ring, a scattering micro-lens ring, a main light bar, a night light bar, a diffusion plate, a light guide plate and a reflective sheet, wherein the main surface ring is a hollow annular cavity, the night light surface ring and the backing plate are successively disposed on the main surface ring, the diffusion ring and the scattering micro-lens ring are disposed inside the night light surface ring, the main light bar is fixedly disposed inside the annular cavity of the main surface ring, the night light bar is disposed in a cavity formed by enclosing the main surface ring and the night light surface ring, the diffusion ring and the scattering micro-lens ring diffuse and reflect rays sent by the night light bar respectively, and the diffusion plate, the light guide plate and the reflective sheet are successively disposed in the annular cavity of the main surface ring from bottom to top.

2. The panel light with the night light function according to claim 1, wherein the main surface ring comprises a surface ring main body and a radiating rib, the surface ring main body is a hollow and annular aluminum alloy die casting, the radiating rib is disposed at a side of a hollow ring of the surface ring main body, and the radiating rib is higher than the night light surface ring.

3. The panel light with the night light function according to claim 2, wherein the main light bar and the night light bar are respectively disposed at two sides of the radiating rib.

4. The panel light with the night light function according to claim 2, wherein the main surface ring at least comprises two installation members, which are disposed on the surface ring main body.

5. The panel light with the night light function according to claim 4, wherein the two installation members are symmetrically disposed on the surface ring main body, and a trunking is disposed on one installation member.

6. The panel light with the night light function according to claim 1, wherein a plurality of fixing studs are disposed on the night light surface ring.

7. The panel light with the night light function according to claim 1, wherein the backing plate fixes the main surface ring and the night light surface ring through a plurality of fixing members.

8. The panel light with the night light function according to claim 1, wherein a plurality of LED light beads with different colors and temperatures are successively and respectively disposed on the main light bar and the night light bar at equal intervals.

9. The panel light with the night light function according to claim 1, wherein a control plate is disposed in the cavity formed by the main surface ring and the backing plate or on the backing plate, and the control plate is respectively and electrically connected to the main light bar and the night light bar.

10. The panel light with the night light function according to claim 9, wherein a wireless remote control module is disposed on the control plate.

* * * * *